(12) United States Patent
Li

(10) Patent No.: US 8,690,408 B2
(45) Date of Patent: Apr. 8, 2014

(54) METHODS, SYSTEMS, AND PRODUCTS FOR ILLUMINATING DISPLAYS

(75) Inventor: Kevin A. Li, Chatham, NJ (US)

(73) Assignee: AT&T Intellectual Property I, L. P., Atlanta, GA (US)

( * ) Notice: Subject to any disclaimer, the term of this patent is extended or adjusted under 35 U.S.C. 154(b) by 391 days.

(21) Appl. No.: 12/959,905

(22) Filed: Dec. 3, 2010

(65) Prior Publication Data
US 2012/0140515 A1 Jun. 7, 2012

(51) Int. Cl.
*F21V 8/00* (2006.01)

(52) U.S. Cl.
USPC .......................................... 362/603; 362/606

(58) Field of Classification Search
USPC ................... 362/603, 606, 618, 624
See application file for complete search history.

(56) References Cited

U.S. PATENT DOCUMENTS

| | | | |
|---|---|---|---|
| 5,319,491 A | 6/1994 | Selbrede | |
| 5,396,350 A | 3/1995 | Beeson et al. | |
| 5,596,671 A | 1/1997 | Rockwell, III | |
| 6,891,658 B2 | 5/2005 | Whitehead et al. | |
| 7,093,968 B2 | 8/2006 | Hsueh et al. | |
| 7,164,536 B2 | 1/2007 | Whitehead | |
| 7,507,012 B2 | 3/2009 | Aylward et al. | |
| 7,515,326 B2 | 4/2009 | Selbrede et al. | |
| 7,660,509 B2 | 2/2010 | Bryan et al. | |
| 7,740,387 B2 | 6/2010 | Schultz et al. | |
| 7,775,700 B2 | 8/2010 | Lee | |
| 8,243,424 B1 | 8/2012 | Babu et al. | |
| 8,345,073 B1 | 1/2013 | Hebenstreit et al. | |
| 8,416,365 B1 | 4/2013 | Rosenberg et al. | |
| 2007/0008739 A1 | 1/2007 | Kim et al. | |
| 2007/0019434 A1 | 1/2007 | Lee | |
| 2007/0263137 A1* | 11/2007 | Shigeta et al. | 349/63 |
| 2008/0219024 A1 | 9/2008 | Mi et al. | |
| 2009/0262083 A1 | 10/2009 | Parekh | |
| 2010/0079843 A1* | 4/2010 | Derichs et al. | 359/259 |
| 2011/0043435 A1 | 2/2011 | Hebenstreit et al. | |

* cited by examiner

*Primary Examiner* — David V Bruce
(74) *Attorney, Agent, or Firm* — Scott P. Zimmerman, PLLC (57) ABSTRACT

Methods, systems, and products illuminate display devices. Light is injected into a waveguide and directed onto an array of picture elements. The light reflects from the array of picture elements through the waveguide, thus illuminating the array of picture elements.

20 Claims, 10 Drawing Sheets

METHODS, SYSTEMS, AND PRODUCTS FOR ILLUMINATING DISPLAYS

COPYRIGHT NOTIFICATION

A portion of the disclosure of this patent document and its attachments contain material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND

Exemplary embodiments generally relate to computer graphics processing, to visual displays, to liquid crystal elements and systems, to optical systems and elements, and to illumination and, more particularly, to display driving control circuitry, to edge-lit light guides, and to edge-lighted panels.

Electronic displays are commonly used as output devices. Flat-panel displays, for example, are used in computers, cell phones, and entertainment systems to display movies, pictures, and other content. Conventional electronic displays, though, are back lit. That is, conventional electronic displays are illuminated from behind.

BRIEF DESCRIPTION OF THE SEVERAL VIEWS OF THE DRAWINGS

The features, aspects, and advantages of the exemplary embodiments are better understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
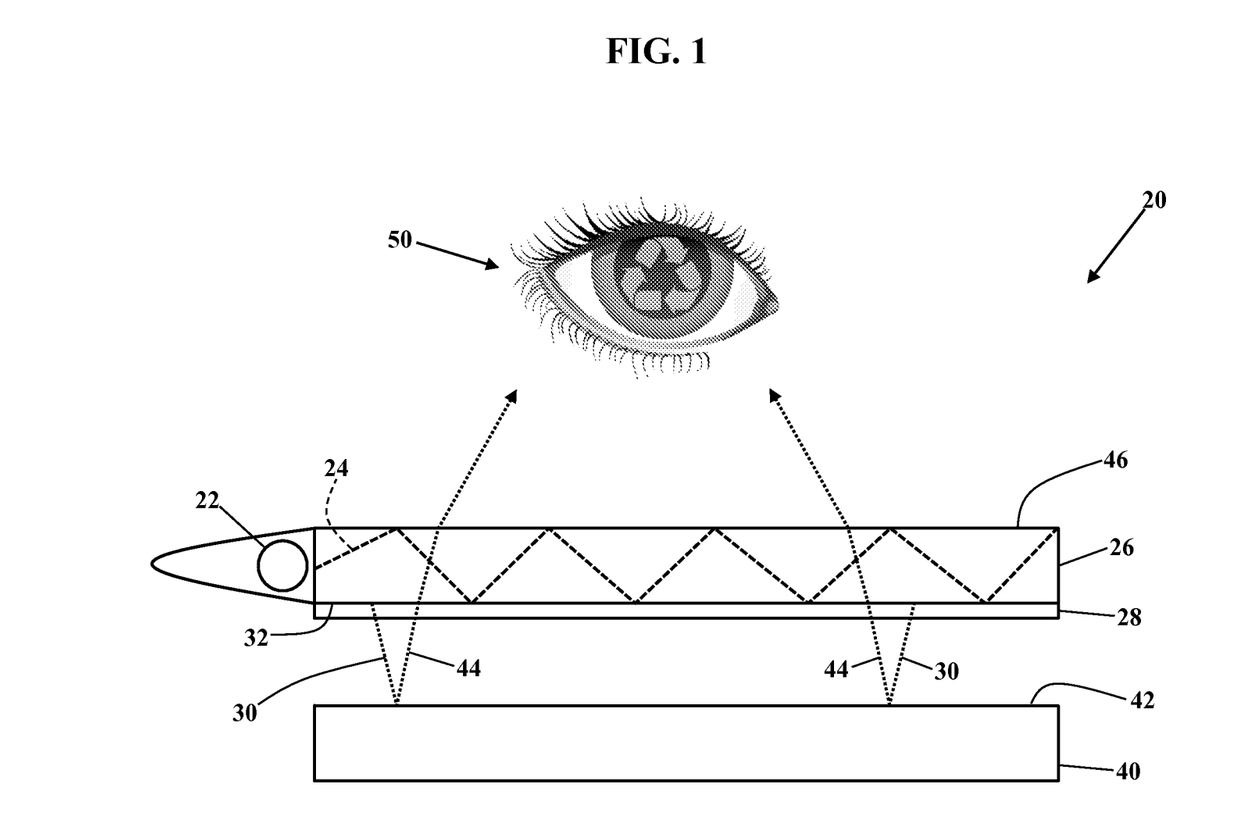
FIG. 1 is a simplified sectional view of an illuminated display device, according to exemplary embodiments.

FIG. 1 is a simplified sectional view of an illuminated display device 20, according to exemplary embodiments. A light source 22 injects or emits light 24 into a waveguide 26. The light 24 may be injected at an angle such that total internal reflection (or "TIR") is obtained. Because the injected light 24 is totally internally reflected within the waveguide 26, a frustrator 28 may cause frustrated light 30 to exit a bottom surface 32 of the waveguide 26. The frustrated light 30 is directed downward and onto electronic picture elements (or "pixels"). The picture elements are commonly arranged in a two-dimensional grid forming an array 40 of picture elements, as in liquid crystal, plasma, and digital light projector (or "DLP") displays. Because the waveguide 26 is arranged above the array 40 of picture elements, the frustrated light 30 is incident an upper surface 42, thus illuminating the array 40 of picture elements from above. Reflected light 44 reflects off the upper surface 42 of the array 40 of picture elements and travels back into the waveguide 26. The reflected light 44 propagates through the waveguide 26 and exits an outer surface 46 of the waveguide 26. The reflected light 44 thus presents to a viewer's eye 50 an image created by the array 40 of picture elements. FIG. 1 thus illustrates a top-lit arrangement in which the array 40 of picture elements is illuminated from above.

FIG. 1 thus illustrates illumination using frustrated total internal reflection (or "FTIR"). FIG. 1, though, uses frustrated total internal reflection to illuminate the array 40 of picture elements from above. Exemplary embodiments thus position, arrange, or place the waveguide 26 between the array 40 of picture elements and the viewer's eye 50. That is, the frustrated light 30 (that exits the waveguide 26) illuminates the upper surface 42 of the array 40 of picture elements. The reflected light 44 propagates back through the waveguide 26, exits the outer surface 46 of the waveguide 26, and travels to the viewer's eye 50. The total internal reflection and the frustrated total internal reflection are well known physical and optical phenomena to those of ordinary skill in the art. This disclosure, then, need not further explain either phenomena.

Figure 2:
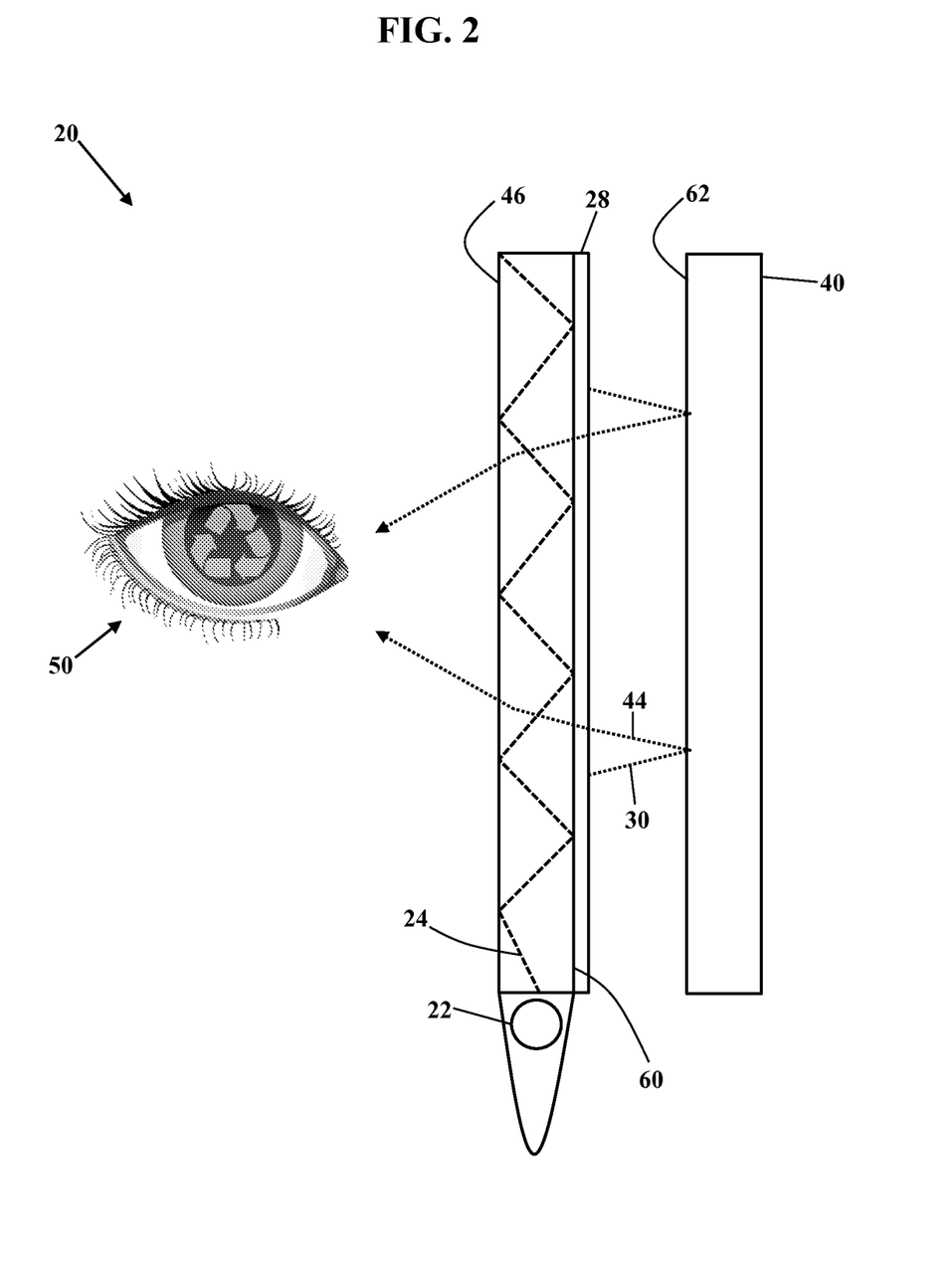
FIG. 2 is a sectional view of a front-lit display device, according to exemplary embodiments.

FIG. 2 is another sectional view of the illuminated display device 20, according to exemplary embodiments. Here, though, the terminology is changed to illustrate a front-lit orientation. The light 24 is injected and total internal reflection is obtained. The frustrator 28 is placed or applied to an inner (or right) surface 60 of the waveguide 26, thus causing the frustrated light 30 to exit the inner surface 60. The frustrated light 30 illuminates an outward surface 62 of the array 40 of picture elements. Reflected light 44 reflects off the array 40 of picture elements and travels back into the waveguide 26. The reflected light 44 propagates through the waveguide 26, exits the outer surface 46 of the waveguide 26, and travels to the viewer's eye 50.

Figure 3:
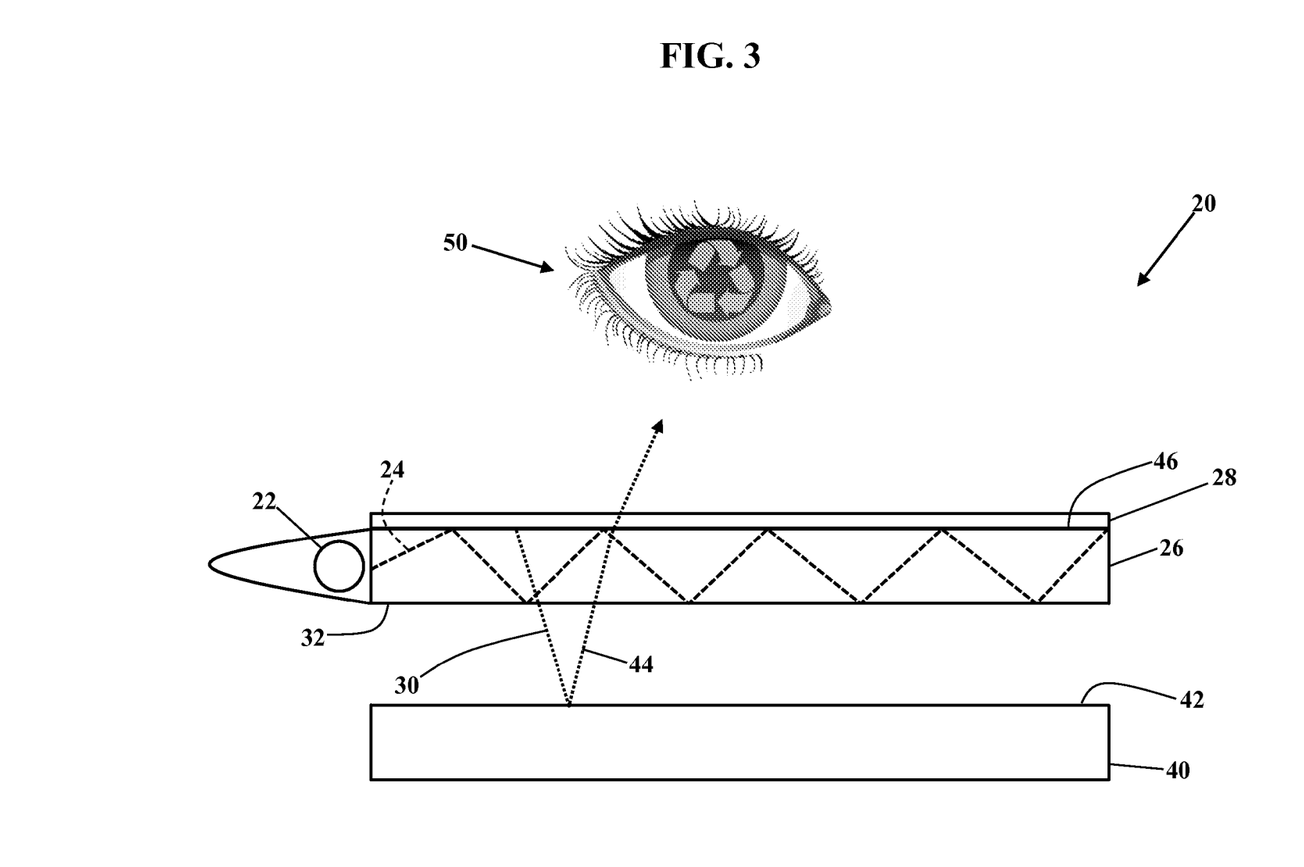
FIG. 3 is another sectional view of an illuminated display device, according to exemplary embodiments.

FIG. 3 is another sectional view of the illuminated display device 20, according to exemplary embodiments. Here the frustrator 28 is placed or applied to the outer surface 46 of the waveguide 26. The light 24 is injected and total internal reflection is obtained. Because the frustrator 28 is placed or applied to the outer surface 46 of the waveguide 26, the frustrated light 30 also enters and propagates through an interior region of the waveguide 26. The frustrated light 30 exits the bottom surface 32 of the waveguide 26 and illuminates the upper surface 42 of the array 40 of picture elements. The reflected light 44 propagates back through the waveguide 26, exits the outer surface 46 of the waveguide 26, and travels to the viewer's eye 50. FIG. 3 thus illustrates that the frustrator 28 may be placed on either the bottom surface 32 or the outer surface 46 of the waveguide 26, according to exemplary embodiments.

FIGS. 1-3 thus illustrate incoming light and reflected light. The incoming light 24 propagates through the waveguide 26. The incoming light 24 is directed from the waveguide 26 and onto the array 40 of picture elements. The incoming light 24 reflects from the array 40 of picture elements and back into the waveguide 26, thus creating the reflected light 44. The incoming light 24 may travel in a first direction, and the reflected light 44 may travel in a second direction. The incoming light 24 and the reflected light 44 may even travel in opposite directions, such as when the incoming light 24 is normally incident to upper surface 42 of the array 40 of picture elements.

The light source 22 illustrated in FIGS. 1-3 may inject light of any frequency. The light source 22, for example, may inject visible light into the waveguide 26. The visible light may be of any frequency in the electromagnetic spectrum that is perceivable by the human eye 50. The light source 22 may even emit or inject monochromatic light (such as red or blue light). The light source 22 may even be variable, thus permitting a human or software program to select colors of illumination. The light source 22, however, may also inject ultraviolet, infrared, and any other frequencies in the electromagnetic spectrum. The light source 22 may be light emitting diodes. The light source 22 may be a single light emitting diode or a bank or series of light emitting diodes. If cost and design permit, the light source 22 may be a string of light emitting diodes that are arranged around at least a portion of an edge perimeter of the array 40 of picture elements. The light source 22, however, may utilize incandescent elements.

The frustrator 28 may be of any design. The frustrator 28, for example, may be any metallic cladding applied to the inner (or right) surface 32 or 60 of the waveguide 26, thus causing the frustrated light 30 to locally exit the waveguide 26. The frustrator 28, however, may be any non-metallic coating applied to the waveguide 26. The frustrator 28, for example, may be any polymeric or elastomeric thin film, sheet, or material that is applied or adhered to the waveguide 26. The frustrator 28, in other words, may be any transparent or semi-transparent material that extracts the frustrated light 30 from the waveguide 26.

The waveguide 26 may also be of any shape and design. The waveguide 26 generally has a planar cross-section, although opposite surfaces and/or sides need not be parallel. The bottom surface 32 of the waveguide 26 and the outer surface 46 of the waveguide 26, for example, may be parallel. The bottom surface 32 and the outer surface 46, however, may not be parallel, thus having a wedge-shaped cross-section. Moreover, the waveguide 26 may have any number of edges or sides. The waveguide 26, for example, may have a rectangular top or plan view, thus having four (4) edges or sides. The waveguide 26, however, may have a triangular shape (e.g., three sides or edges) when viewed from above (plan view). The waveguide 26, however, may have more than four edges, such as a pentagonal or hexagonal shape when viewed from above. The waveguide 26 may also be constructed or formed of any material, such as glass, polymer, and/or acrylic. The waveguide 26 may also be transparent or even semi-transparent that transmits the reflected light 44.

Figure 4:
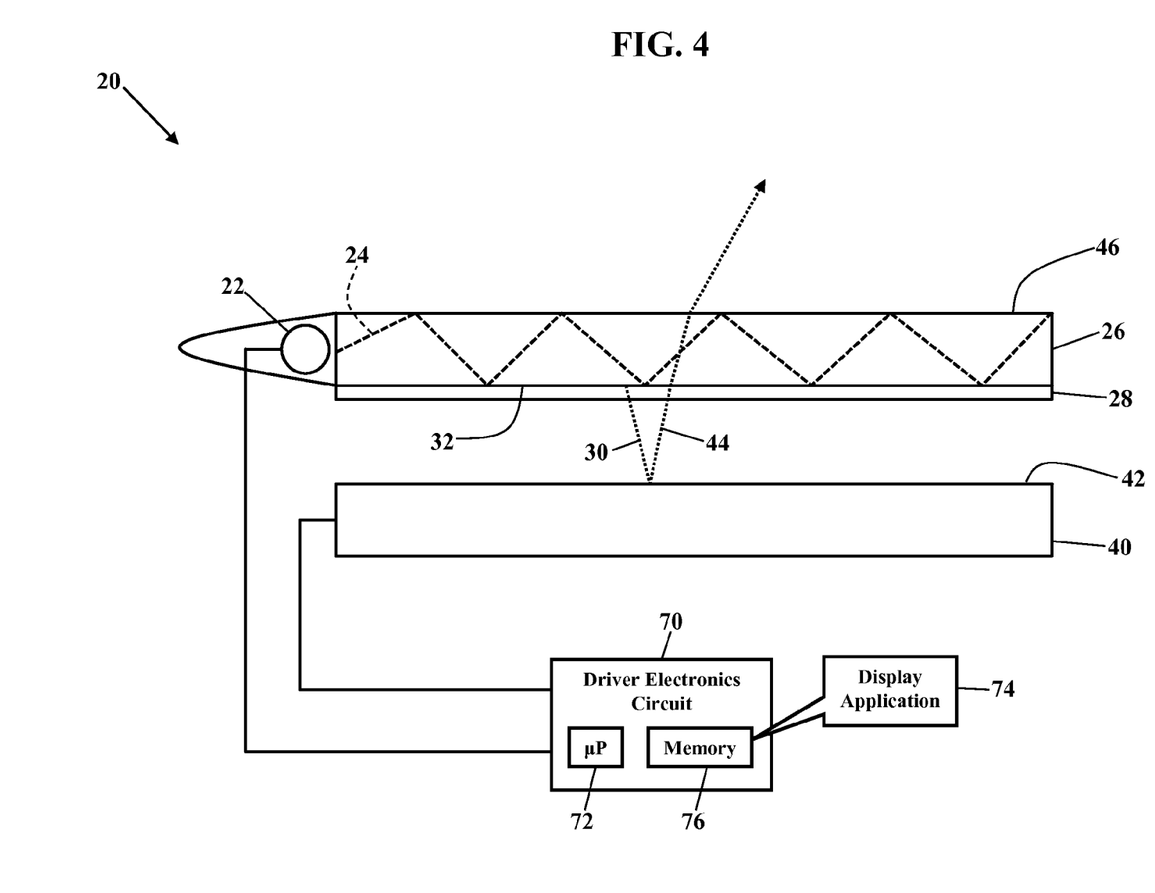
FIG. 4 is a block diagram illustrating the illuminated display device, according to exemplary embodiments.

FIG. 4 is a block diagram illustrating the illuminated display device 20, according to exemplary embodiments. Here the display device 20 may include a driver electronics circuit 70. Each picture element (or "pixel") in the array 40 of picture elements may be individually switched on and off by the driver electronics circuit 70. A processor 72 (e.g., "μP"), application specific integrated circuit (ASIC), or other component may execute a display algorithm 74 stored in a memory 76. The display algorithm 74 includes code or instructions may cause the processor 72 to control the driver electronics circuit 70, the array 40 of picture elements, and/or the light source 20. The driver electronics circuit 70 may apply a voltage to electrically activate any picture element in the array 40 of picture elements to produce any image. The driver electronics circuit 70, the processor 72, and the display algorithm 74 may cooperate to control the array 40 of picture elements and/or to create an image by the array 40 of picture elements. The display algorithm 74 may even cause the processor 72 to produce sounds and other audible features.

Figure 5:
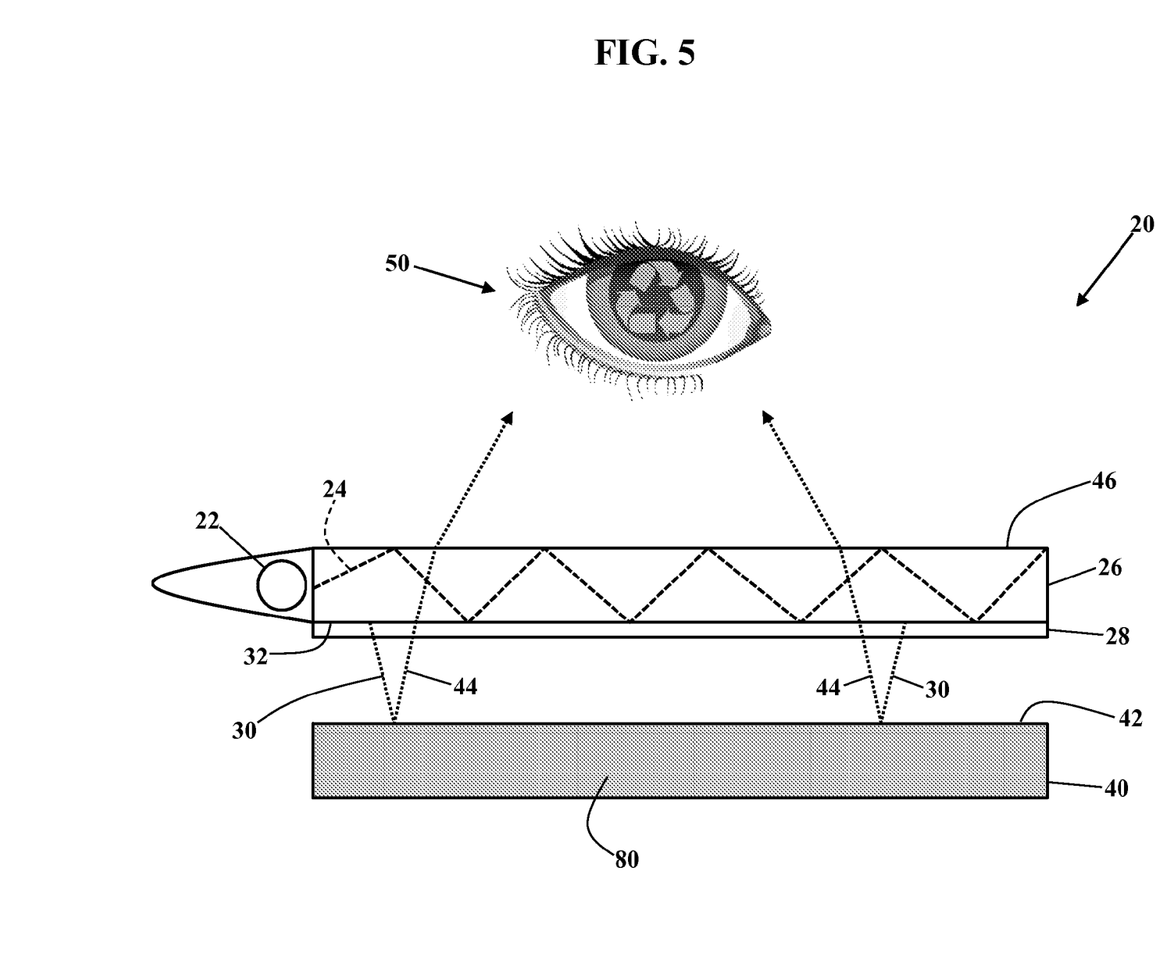
FIG. 5 is a sectional view of an illuminated display device using an opaque array of picture elements, according to exemplary embodiments.

FIG. 5 is another sectional view of the illuminated display device 20, according to exemplary embodiments. Here the array 40 of picture elements may be opaque 80, thus mostly or substantially preventing light from passing or propagating through the array 40 of picture elements. Conventional displays utilize transparent picture elements, thus allowing the picture elements to be illuminated from behind or below. When the picture elements are opaque, as in electronic ink devices, light cannot propagate through opaque picture elements. Because exemplary embodiments arrange the array 40 of picture elements below or behind the waveguide 26, exemplary embodiments may illuminate opaque picture elements.

As FIG. 5 illustrates, the light source 22 injects the light 24 into the waveguide 26. The frustrator 28 causes the frustrated light 30 to exit the inner surface 32 of the waveguide 26. The frustrated light 30 illuminates the outward surface 42 of the array 40 of picture elements. Even if the individual picture elements (in the array 40 of picture elements) are opaque, the reflected light 44 still reflects back into the waveguide 26. The reflected light 44 propagates through the waveguide 26, exits the outer surface 46 of the waveguide 26, and travels to the viewer's eye 50. FIG. 5 thus illustrates that exemplary embodiments may be used with both transparent and/or opaque picture elements. Exemplary embodiments, in other words, may illuminate any type of picture element, whether transparent or opaque.

Figure 6:
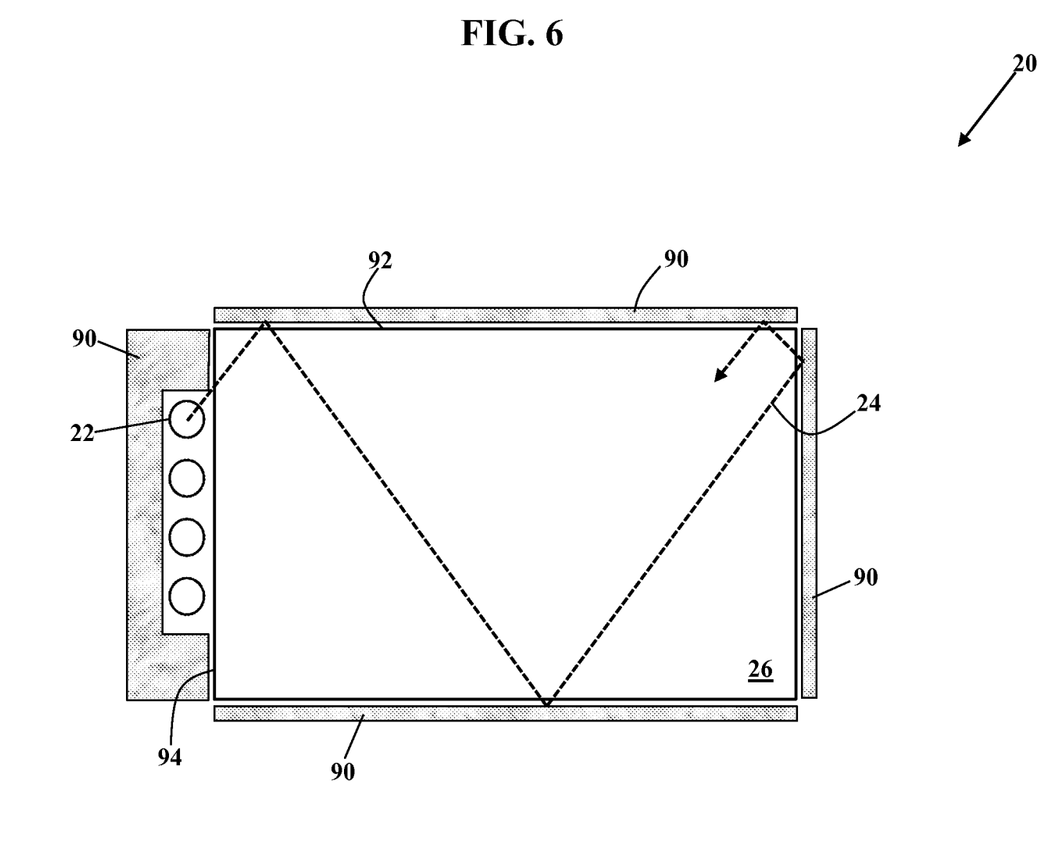
FIG. 6 is a top view of the illuminated display device, according to exemplary embodiments.

FIG. 6 is a top view of the illuminated display device 20, according to exemplary embodiments. Here the illuminated display device 20 may use one or more reflectors 90 to reflect the light 24 that escapes from edges 92 of the waveguide 26. As FIG. 6 illustrates, when the light 24 is injected into an injection edge 94 of the waveguide 26, some escaping light 24 may escape from normal and/or opposite edges 92 of the waveguide 26. The reflectors 90 may be oriented or arranged to reflect the escaping light 24 back into the waveguide 26.

Figure 7:
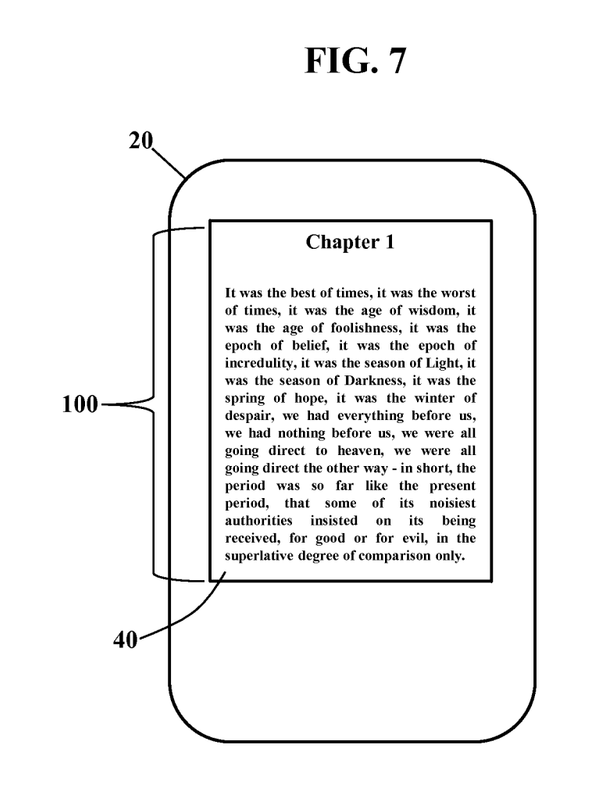
FIGS. 7-9 are schematics illustrating magnification, according to exemplary embodiments.
Figure 8:
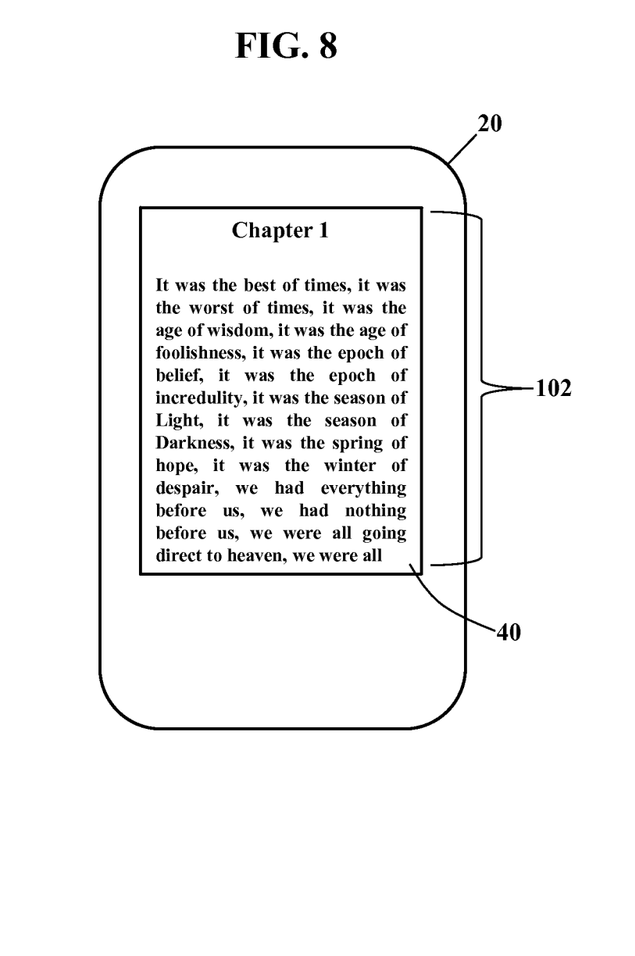
Figure 9:
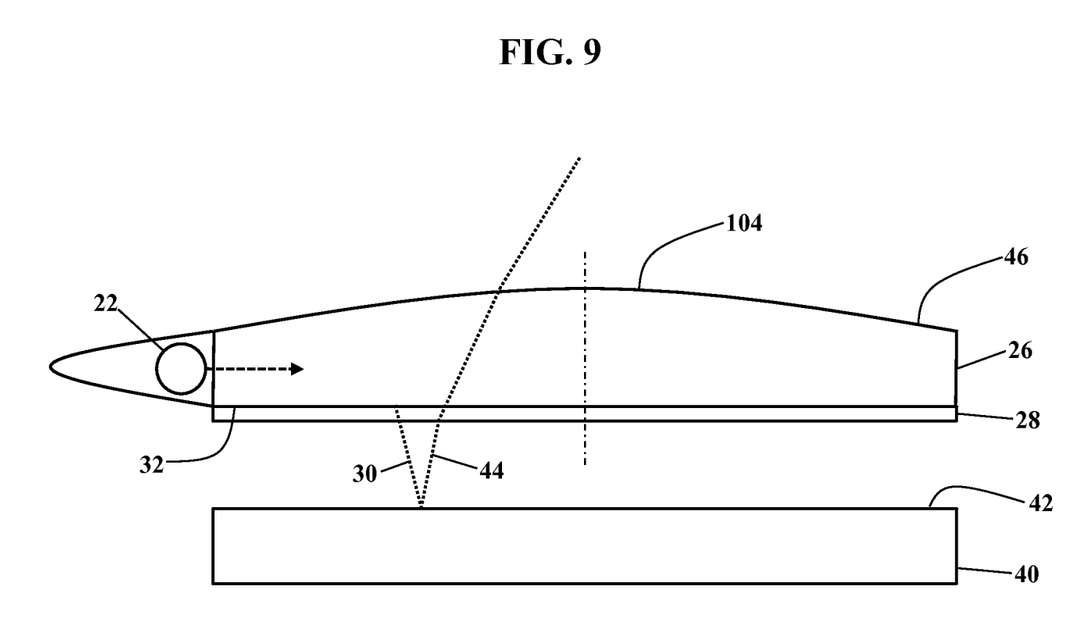

FIGS. 7-9 are schematics illustrating magnification, according to exemplary embodiments. FIGS. 7-8 are top views of the illuminated display device 20, while FIG. 9 is another sectional view. FIG. 7 illustrates an image or output 100 produced by the array 40 of picture elements, while FIG. 8 illustrates a magnified view 102 of that same image or output. Because exemplary embodiments place the waveguide 26 between the array 40 of picture elements and the viewer's eye (as illustrated in FIGS. 1, 2 and 5), exemplary embodiments may also magnify an output produced by the array 40 of picture elements. As FIG. 9 illustrates, the waveguide 26 may optically magnify the image or output produced by the array 40 of picture elements. The top, outer surface 46 of the waveguide 26, for example, may have a convex cross-sectional contour 104, thus acting as a magnifying lens to enlarge an appearance of the image or output produced by the array 40 of picture elements. Magnification may be especially useful for cell phones, e-readers, and other devices with small displays. Exemplary embodiments, however, may also de-magnify (such as when the outer surface 46 of the waveguide 26 has a concave cross-sectional contour).

Figure 10:
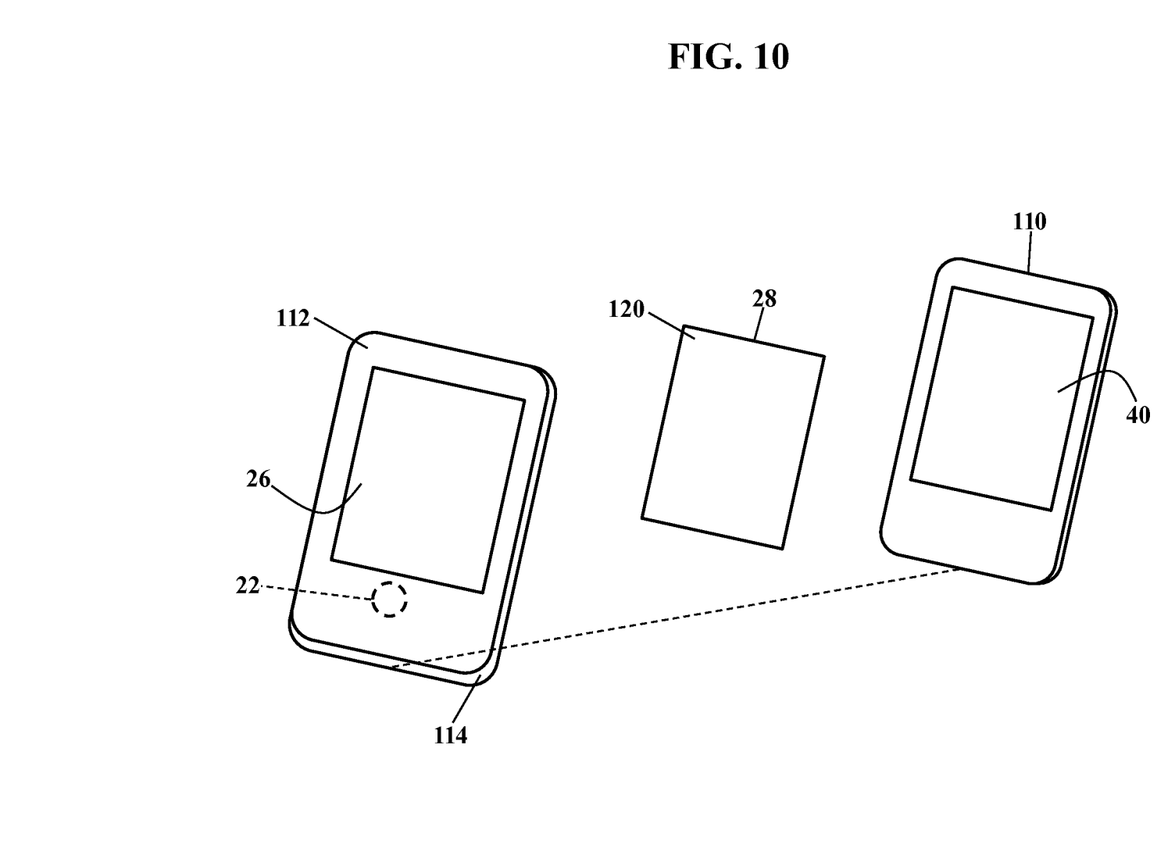
FIG. 10 is an exploded view of a computing device incorporating the exemplary embodiments.

FIG. 10 is an exploded view of a computing device 110 incorporating the exemplary embodiments. The computing device 110 may be any laptop computer, tablet computer, or other processor controlled device. FIG. 10, though, illustrates the waveguide 26 having a snap-on configuration for mating to the computing device 110. The waveguide 26 is constructed to include an outer frame 112. The outer frame 112 may have a resilient, peripheral lip 114 that is sized to slip-on or snap over the computing device 110. The outer frame 112, for example, may be designed and sized to mate with an outer casing of any laptop computer, electronic reader (or "e-reader"), or tablet (such as the IPAD® from APPLE®, Inc.). The outer frame 112 may thus snap onto or over the computing device 110, thus arranging the waveguide 26 above the array 40 of picture elements of the computing device 110.

Frustration may thus be achieved. As many computing devices 110 include a thin-film screen protector 120, the screen protector 120 may double as the frustrator 28. That is, when the outer frame 112 is snapped onto and/or over the computing device 110, the waveguide 26 is oriented near to or against the thin-film screen protector 120. The light source 22 within the outer frame 112 injects the light into the waveguide 26, and the thin-film screen protector 120 causes the frustrated light (illustrated as reference numeral 30 in FIGS. 1-4) to exit the waveguide 26 and to shine down onto the array 40 of picture elements of the computing device 110. The frustrated light 30 illuminates the array 40 of picture elements and reflects back through the waveguide 26 toward the viewer's eye 50.

FIG. 10 thus illustrates a clever snap-on device that illuminates the computing device 110. The outer frame 112 may be snapped on or overlaid onto the computing device 110 to illuminate the array 40 of picture elements. Exemplary embodiments may thus provide illumination of inexpensive electronic readers (such as the AMAZON® KINDLE®) that utilize electronic ink technology. The outer frame 112 may be sized to snuggly fit or snap over any computing device 110 to provide illumination.

Figure 11:
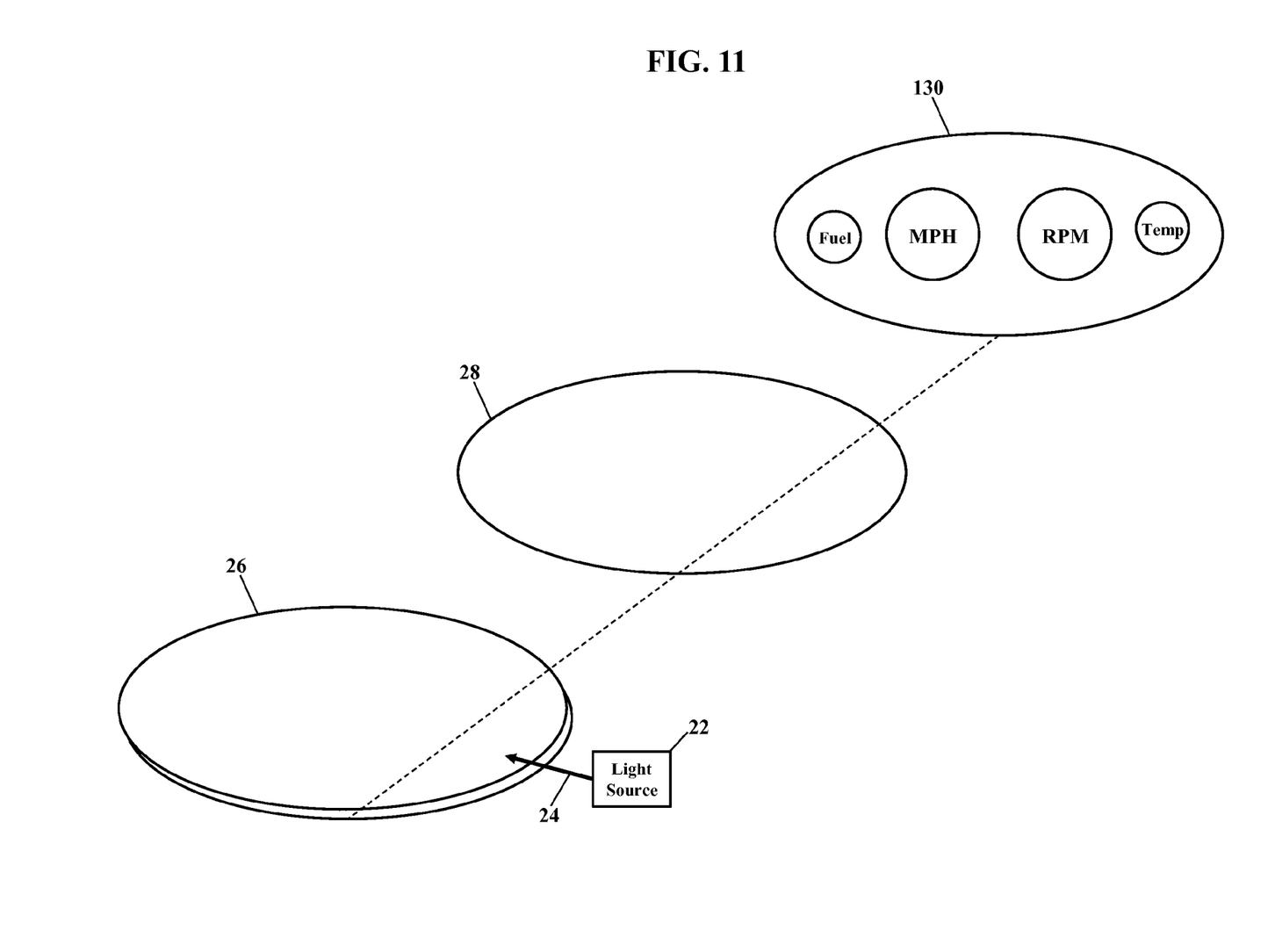
FIG. 11 is an exploded view of an instrument cluster incorporating the exemplary embodiments.

FIG. 11 is an exploded view of an instrument cluster 130 incorporating the exemplary embodiments. Most cars, trucks, and other vehicle have an instrument cluster providing speed, fuel level, and other driver information. Exemplary embodiments may be used to illuminate the instrument cluster 130 again using frustrated total internal reflection. The waveguide 26 is placed or arranged above the instrument cluster 130. The frustrator 28 is added or applied between the instrument cluster 130 and the waveguide 26. The light source 22 injects the light 24 into the waveguide 26, and the frustrator 28 causes the frustrated light 30 to illuminate a surface of the instrument cluster 130. The reflected light 44 propagates back through the waveguide 26 and travels to the driver's eye. Exemplary embodiments thus allow the instrument cluster 130 to be inexpensively illuminated from above, instead of from behind.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:

1. A method, comprising:
    injecting incoming light into a waveguide;
    frustrating total internal reflectance of the incoming light in the waveguide;
    directing the incoming light in a first direction onto an array of picture elements;
    reflecting the incoming light from the array of picture elements through the waveguide to create a reflected light traveling in a second direction; and
    controlling the array of picture elements to create an image, the reflected light presenting to a viewer the image created by the array of picture elements.

2. The method according to claim 1, further comprising reflecting the incoming light in an opposite direction to the incoming light.

3. The method according to claim 1, wherein reflecting the incoming light comprises creating the reflected light traveling in a second direction opposite to the first direction.

4. The method according to claim 1, further comprising applying a frustrator to the waveguide.

5. The method according to claim 1, wherein injecting the incoming light comprises injecting visible light into the waveguide.

6. The method according to claim 1, further comprising applying a voltage to the array of picture elements.

7. The method according to claim 1, further comprising arranging the array of picture elements below the waveguide.

8. The method according to claim 1, further comprising arranging the array of picture elements behind the waveguide.

9. The method according to claim 1, further comprising arranging the waveguide between the array of picture elements and the viewer.

10. An apparatus, comprising:
an opaque array of picture elements;
a waveguide arranged above the array of picture elements, the waveguide emitting light onto the array of picture elements, and the waveguide transmitting reflected light from the array of picture elements; and
a reflector to reflect the light emitted from an edge of the waveguide.

11. The apparatus according to claim 10, further comprising a layer of material that frustrates total internal reflectance of the light in the waveguide.

12. The apparatus according to claim 10, further comprising a coating that frustrates total internal reflectance of the light in the waveguide.

13. The apparatus according to claim 10, further comprising a film that frustrates total internal reflectance of the light in the waveguide.

14. The apparatus according to claim 10, further comprising a source that injects the light into the waveguide.

15. The apparatus according to claim 10, further comprising a circuit that applies a voltage to the array of picture elements.

16. The apparatus according to claim 10, further comprising a magnifier that optically magnifies an image produced by the array of picture elements.

17. The apparatus according to claim 10, further comprising a frustrator that extracts the light from the waveguide.

18. The apparatus according to claim 10, further comprising a magnifier that optically magnifies an output produced by the array of picture elements.

19. An apparatus, comprising:
a source injecting light into a transparent waveguide;
a frustrator that extracts frustrated light from the waveguide; and
an opaque array of picture elements arranged below the waveguide to reflect the frustrated light back into the waveguide,
wherein the array of picture elements is illuminated from above by the waveguide.

20. The apparatus according to claim 19, wherein the frustrator is at least one of a coating and a film applied to the waveguide.

* * * * *